Figure 1:
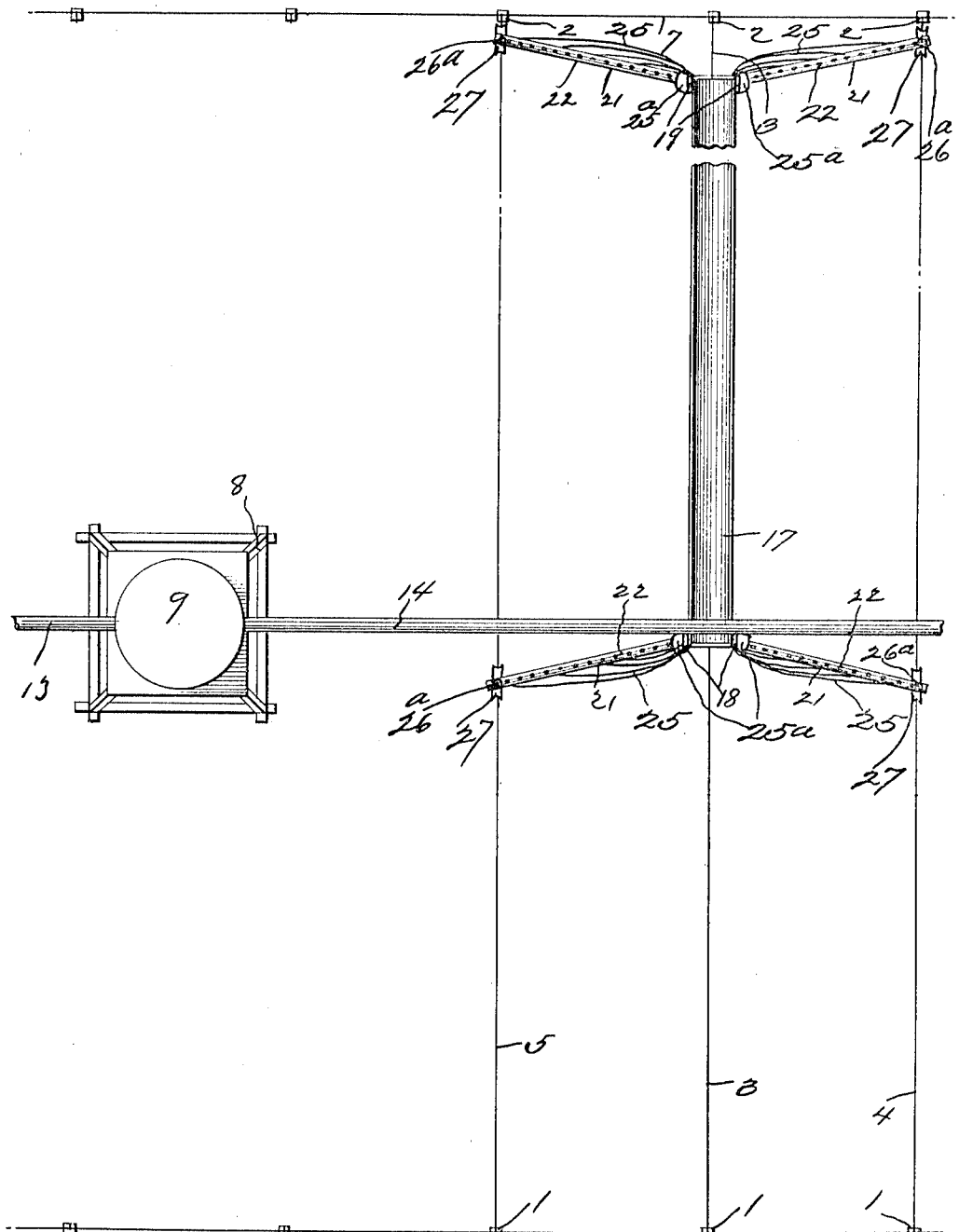

Y. R. ANDERSON.
ELEVATED IRRIGATION SYSTEM.
APPLICATION FILED OCT. 7, 1912.

1,073,834. Patented Sept. 23, 1913.
3 SHEETS—SHEET 1.

Y. R. ANDERSON.
ELEVATED IRRIGATION SYSTEM.
APPLICATION FILED OCT. 7, 1912.

1,073,834.

Patented Sept. 23, 1913.
3 SHEETS—SHEET 2.

Witnesses:

Inventor:
Young Rhia Anderson

Y. R. ANDERSON.
ELEVATED IRRIGATION SYSTEM.
APPLICATION FILED OCT. 7, 1912.
1,073,834.
Patented Sept. 23, 1913.
3 SHEETS—SHEET 3.
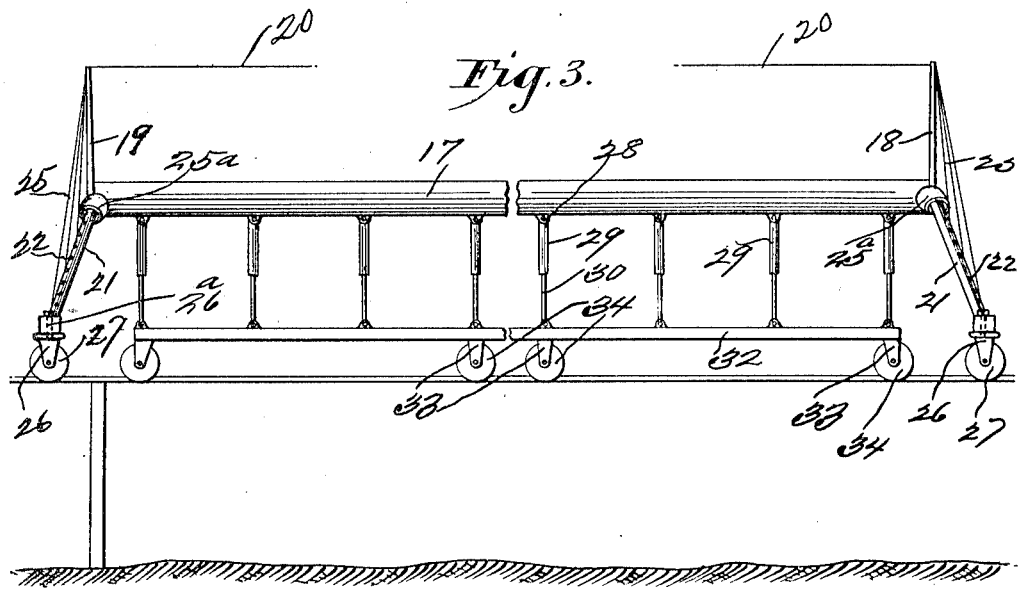
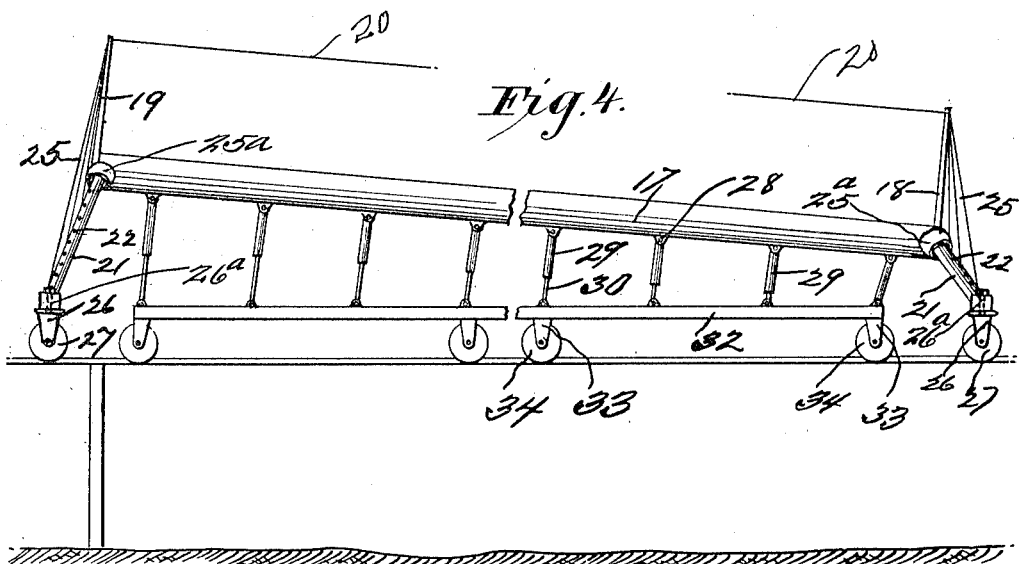

UNITED STATES PATENT OFFICE.

YOUNG RHEA ANDERSON, OF OLNEY, TEXAS, ASSIGNOR OF ONE-TENTH TO LAWSON CEPHAS COUNTS, OF OLNEY, TEXAS.

ELEVATED IRRIGATION SYSTEM.

1,073,834.  Specification of Letters Patent.  Patented Sept. 23, 1913.

Application filed October 7, 1912. Serial No. 724,493.

*To all whom it may concern:*

Be it known that I, YOUNG RHEA ANDERSON, a citizen of the United States, residing at Olney, in the county of Young and State of Texas, have invented a new and useful construction of Elevated Irrigation Systems, of which the following is a specification.

This invention relates to a new and useful apparatus or system for supplying and distributing water, for the irrigation of large tracts of land.

One of the objects of the invention is the provision of such an apparatus, so constructed that a lead water trough including lead spray pipes may be adjusted, whereby the water for irrigating, sprinkling or watering the land may be regulated, in a manner resembling nature's draining system.

A feature of the invention is the provision of an apparatus or system which may be used in connection with various elevated water tanks systemmatically arranged, however, only one of such tanks is illustrated in the accompanying drawings. This tank may be supplied or filled from any available water supply by pumping or other convenient means from rivers, lakes, ponds, or wells. The tank or tanks may be elevated at any desirable height, so as to cause a proper flow of water into one or more main water pipes.

Another feature of the invention is the provision of a water lead trough, either end of which may be lowered below the other end, and having means whereby the same may be mounted upon elevated tracks or cables. The lead water trough may receive its supply from other pipes 15$^a$ (not shown, and which may receive their supply from the pipe 14), or said trough may receive its supply from other tanks and pipes 14 and 15$^a$ (not shown).

In practical fields the details of construction may necessitate alterations, to which the patentee is entitled, provided the alterations fall within the scope of what is claimed.

The invention comprises further features and combination of parts, as hereinafter set forth, shown in the drawings and claimed.

Figure 2:
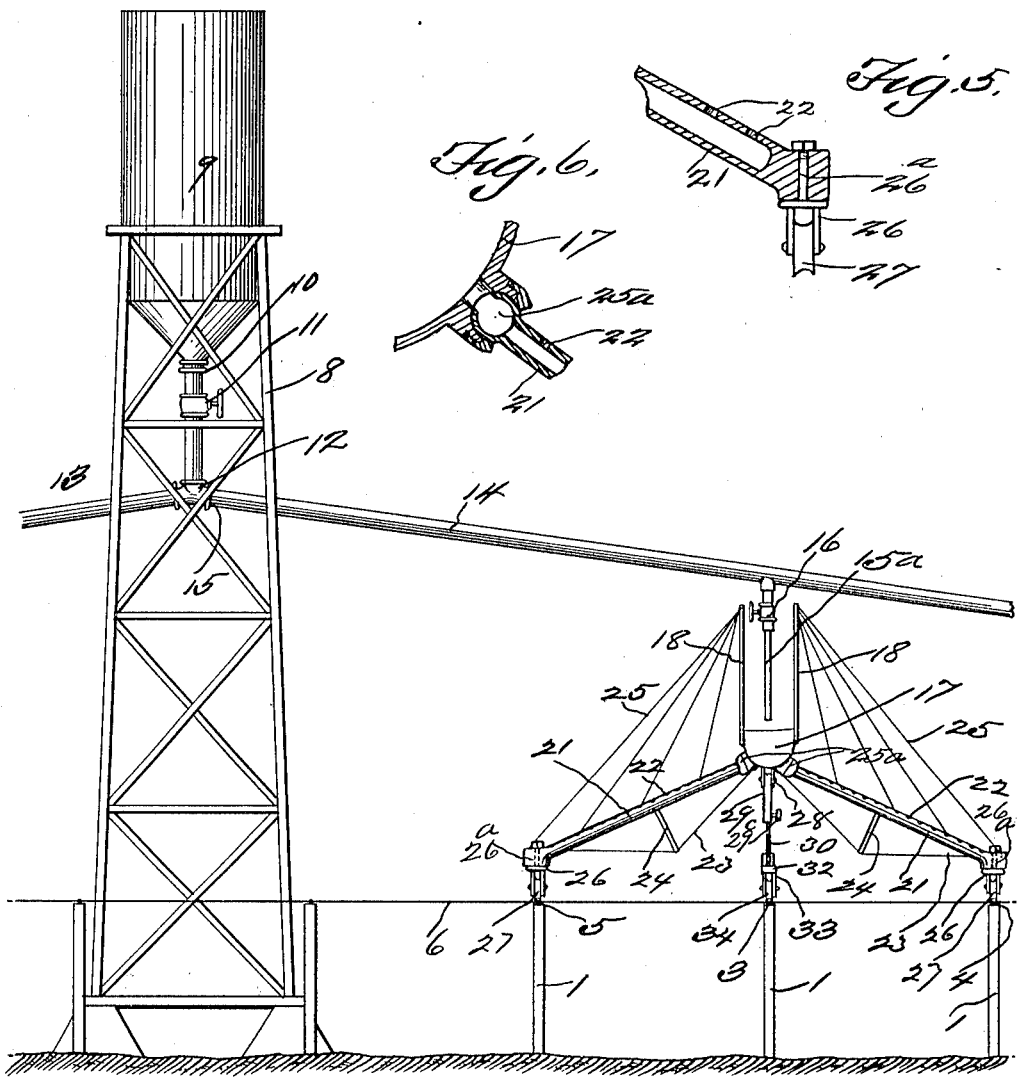

In the drawings:—Figure 1 is a plan view, showing a tank and a portion of the tracks or cables, with the lead water trough including the spray or lead pipes. Fig. 2 is an end elevation, likewise showing an elevated tank. Fig. 3 is a side elevation of one of the lead water troughs, showing the same mounted upon its elevated tracks. Fig. 4 is a view similar to Fig. 3, showing one end of the lead water trough lowered, thereby disposing the lead water trough upon an inclination, whereby the water or irrigation fluid may find its way to the lead or spray pipes at one end of the trough. Fig. 5 is a detail view of the swiveled connection 26$^a$. Fig. 6 is a detail view of the universal connection 25$^a$.

Referring more particularly to the drawings, 1 and 2 designate rows of standards, the standards 1 are arranged opposite the standards 2, and connecting them are tracks 3, 4 and 5, such as cables or the like. Connecting the standards 1 are tie cables or the like 6, while connecting the standards 2 are similar tie cables or the like 7. As shown in the drawings a tower 8 having a water tank 9 is provided, and leading from the lower end of the tank 9 is a pipe 10 provided with the usual form of valve 11. The lower end of the pipe 10 is provided with a T-union 12, into which the pipes 13 and 14 are connected in the usual manner as at 15. The pipe 14 is provided with a plurality of downwardly extending pipes 15$^a$ having valves 16, while the pipe 13 is designed to have pipes (not shown) similar to the pipes 15$^a$. In actual practice, it is the purpose of this invention to employ a series of towers, including elevated tanks.

As shown in the drawings a lead water trough 17 is provided having upwardly extending members 18 and 19, the upper ends of which are connected by the tie rods or wires 20. Universally connected to each end of the lead water trough, as at 25$^a$, and communicating therewith are lead or spray pipes 21 having perforations 22 and provided with reinforcing means 23 and 24 of the usual construction. Connecting the lead or spray pipes and the members 18 and 19 are tie wires or similar members 25, which may be made longer or shorter, in any suitable manner (not shown), so as to accommodate the adjustment of the lead or spray pipes 21. To the outer ends of the lead or spray pipes bracket plates 26 are swiveled, as at 26ª, and are provided with rollers 27, which are designed to engage the tracks 4 and 5.

Pivotally connected with the lead water trough, as indicated at 28 are tubular members 29, which telescopically receive the members 30, which are in turn pivotally connected to the bars 32, which are provided with downwardly extending brackets 33, in which rollers 34 are mounted. The tubular members 29 are provided with thumb screws 29ᶜ to hold the members 29 and 30 in their adjusted positions. The rollers 34 are designed to engage the intermediate track 3. The tubes 29 and the members 30 may be held in telescopical adjusted positions by any suitable means (not shown) in order to hold the lead water trough in an elevated position. By the provision of the telescopical members, one end or the other of the lead water trough may be lowered, as shown in Fig. 4, and when lowered the irrigating fluid in the lead trough may more easily find its way to either pair of lead or spray pipes 21, thereby increasing the force with which the irrigation fluid is sprayed from the perforations. The irrigation fluid is adapted to enter the lead or spray pipes with sufficient force so as to be shot upwardly slightly, so that the fluid will fall upon the ground and soil in a manner resembling nature's method of irrigation, in other words, in a manner similar to rain. In order that the lead water trough may receive the irrigation fluid, the same is adjusted along its tracks so that the fluid from the pipe 15ª will enter the same.

After the land adjacent the tracks 4 and 5 has been thoroughly irrigated, the lead water trough may then be transferred to tracks similar to the tracks 4 and 5 adjacent thereto. In practice this may be accomplished, by connecting the tracks of successive rows by curved tracks (not shown), and as the land adjacent one row of tracks has been irrigated, the lead water trough may be transferred to the adjacent row of tracks, by virtue of the curved tracks (not shown).

The tank 9 may be arranged at sufficient height, so as to lend force to the flow of water or irrigation fluid, while the pipes 14 may be inclined sufficiently and properly in order to accommodate the force and the free flow of water from the elevated tank and out through the outlet pipe 15ª into the lead water trough, which is designed to be conveniently arranged relative to the pipe 15ª, so as to also accommodate the water or irrigation fluid in its flow.

From the foregoing it will be noted that there has been devised a simple and efficient irrigation apparatus for expeditiously irrigating large areas or tracts of land, and one which has been found desirable and practical.

The invention having been set forth, what is claimed as new and useful is:—

1. In a device as set forth, a lead water trough, a pair of spray pipes adjustably connected to each end of the trough and communicating therewith and provided with rollers at their free ends adapted to engage tracks, and means including telescopically connected devices connected to the trough for supporting the same and constituting means for permitting one end or the other of the trough to be lowered.

2. In a device as set forth, a lead water trough, a pair of spray pipes adjustably connected to each end of said trough and communicating therewith and extending laterally, one pipe from each side of the trough, said trough having upwardly extending members, adjustable means connecting the members and the spray pipes, the outer ends of the spray pipes having rollers adapted to engage elevated tracks, and means including telescopically connected devices connected to the trough for supporting the same and provided with rollers to engage a track, said telescopically connected devices constituting means permitting one end or the other of the trough to be lowered.

3. In combination with an elevated water supply system having laterally extending inclined pipes including valves, said inclined pipes having downwardly extending pipes including valves, of a lead water trough adapted to be positioned beneath any one of the downwardly extending pipes, a pair of spray pipes universally connected to and communicating with each end of the trough and provided with rollers adapted to engage tracks, and supporting means for the trough including rollers adapted to engage a track, said supporting means comprising telescopical connections constituting means to permit one end or the other of the trough to be lowered.

In witness whereof, my signature, is hereunto affixed in the presence of two witnesses, this 18th day of March, A. D. 1912.

YOUNG RHEA ANDERSON.

Witnesses:
CHARLES JERRY SIMPSON,
JOHN THOMAS CARLTON.

Copies of this patent may be obtained for five cents each, by addressing the "Commissioner of Patents, Washington, D. C."